United States Patent [19]

Hamaguchi et al.

[11] Patent Number: 4,813,768

[45] Date of Patent: Mar. 21, 1989

[54] LIQUID CRYSTAL DEVICE HAVING AN OBLIQUE EVAPORATION FILM WHICH IS PROTECTED BY A PROTECTIVE LAYER

[75] Inventors: Shigeki Hamaguchi, Aichi; Yasuhiro Otsuka, Toyota; Yasunori Taga, Nagoya; Tomoyashi Motohiro, Seto; Tadayoshi Itoh, Aichi, all of Japan

[73] Assignees: Toyota Jidosha Kabushiki Kaisha; Kabushiki Kaisha Toyota Chuo Kenkyusho, both of Japan

[21] Appl. No.: 111,659

[22] Filed: Oct. 23, 1987

[30] Foreign Application Priority Data

Nov. 4, 1986 [JP] Japan ................... 61-262520

[51] Int. Cl.$^4$ ................. G02F 1/13; G02F 5/132
[52] U.S. Cl. ................. 350/347 R; 350/339 R; 350/400
[58] Field of Search ........... 350/347 R, 335, 339 R, 350/400, 403, 278

[56] References Cited

U.S. PATENT DOCUMENTS

| 3,876,287 | 4/1975 | Sprokel | 350/339 R |
| 4,034,647 | 8/1977 | Oue et al. | 350/341 |
| 4,054,368 | 10/1977 | Krueger et al. | 350/347 E |
| 4,158,484 | 6/1979 | Nishiyama | 350/339 R |
| 4,232,948 | 11/1980 | Shanks | 350/347 R |
| 4,247,166 | 1/1981 | Yeh | 350/400 |
| 4,357,374 | 11/1982 | Ogawa | 350/340 X |
| 4,368,386 | 1/1983 | Huignard et al. | 350/342 X |
| 4,652,090 | 3/1987 | Uchikawa et al. | 350/357 |
| 4,657,350 | 4/1987 | Mori | 350/400 |
| 4,660,939 | 4/1987 | Tsuchiya et al. | 350/357 |
| 4,711,530 | 12/1987 | Nakanowatari et al. | 350/339 R |
| 4,729,638 | 3/1988 | Shirai | 350/347 R |

FOREIGN PATENT DOCUMENTS

| 143728 | 9/1982 | Japan | 350/339 R |
| 143729 | 9/1982 | Japan | 350/339 R |
| 189833 | 11/1983 | Japan | 350/339 R |
| 49508 | 3/1984 | Japan | 350/347 R |
| 97105 | 6/1984 | Japan | 350/347 V |
| 207431 | 11/1984 | Japan | 350/339 R |
| 84625 | 4/1986 | Japan | 350/338 |
| 6184625 | 4/1986 | Japan | 350/338 |
| 2052779 | 1/1981 | United Kingdom | 350/339 R |

OTHER PUBLICATIONS

W. A. Crossland, "Birefringence in Silicon Monoxide Films Used for Aligning Liquid Crystal Layers", Applied Physics Letters, vol. 26, No. 11, Jun. 1, 1975, pp. 598–600.

H. A. Macleod, "Structure-related Optical Properties of Thin Films", J. Vac. Sci.: Technol. A. 4(3), May/-Jun. 1986, pp. 418–422.

Primary Examiner—Stanley D. Miller
Assistant Examiner—Huy Kim Mai
Attorney, Agent, or Firm—Finnegan, Henderson, Farabow, Garrett & Dunner

[57] ABSTRACT

A liquid crystal device having a higher durability and a display quality less likely to be degraded, for example, for use in a glare shield reflection mirror. The liquid crystal device comprises: a pair of substrate plates, a liquid crystal layer filled between the pair of substrate plates, and an oblique evaporation film laminated on one of the substrate plates, wherein a protective layer is formed on the boundary surface between the oblique evaporation film and a neighboring component member. The oblique evaporation film has become less susceptible to the neighboring material, and problems, such a bluish oblique evaporation film due to the proton (H$^+$) intrusion from the neighboring material, have been prevented. Thus the liquid crystal device has come to have a higher durability and a display quality less likely to be degraded.

12 Claims, 3 Drawing Sheets

LIQUID CRYSTAL DEVICE HAVING AN OBLIQUE EVAPORATION FILM WHICH IS PROTECTED BY A PROTECTIVE LAYER

BACKGROUND OF THE INVENTION

1. Field of the Invention

The present invention relates to a liquid crystal device, and more particularly to providing liquid crystal device with improved durability and display quality; i.e. contrast.

2. Description of the Prior Art

Japanese Unexamined Patent Publication (KOKAI) No. 84625/1986 discloses a glare shield reflection mirror formed of the combination of a guest-host liquid crystal device and the oblique evaporation film working s a quarter wavelength retarding wave plate for controlling the reflectivity of incident light to the liquid crystal device. The glare shield reflection mirror has an oblique evaporation film working as the quarter wavelength retarding wave plate integrally formed of a dielectric substance on the transparent substrate surface of said liquid crystal device.

3. Problems with the Prior Art

However, it has been pointed out that the oblique evaporation film working as the quarter wavelength retarding wave plate has weak bonding force because the optical performances have been of importance, and that the oblique evaporation is liable to be adversely affected by a substance contacting with itself. In case the oblique evaporation film is formed of tungsten oxide ($WO_3$), its color is changed to blue, and its display quality is degraded, namely its contrast and so on may sometimes be decreased because of the intrusion of proton ($H^-$) and the like from an aluminum reflection mirror surface formed neighboring to the oblique evaporation film. Further, the oblique evaporation film may sometimes be degraded by the mechanical shock such as rubbing and the like exerted on the aligning film, and transmitted from the aligning film side during production.

SUMMARY OF THE INVENTION

Object of the Invention

The present invention has been achieved in view of the above problems.

It is an object of the present invention to make said oblique evaporation film less susceptible to the neighboring substance.

It is a further object of the present invention to provide a liquid crystal device having a higher durability and a display quality less likely to be degraded.

A liquid crystal device according to the present invention comprises:

a pair of substrate plates, a liquid crystal layer filled between said pair of substrate plates for electrically controlling the light transmissivity, and an oblique evaporation film laminated on one of said substrate plates for retarding the phase of transmitting light by the predetermined width of the wavelength, wherein a protective layer is formed between said oblique evaporation film and the neighboring component member thereof; i.e. a reflection component member and/or a liquid crystal layer.

The component members of the present invention will be hereinafter explained.

For the substrate, a conventionally used transparent substance such as glass, plastics and the like is also used in the present invention.

The liquid crystal layer is composed of a guest-host liquid crystal mixed with a dichromatic coloring material. The liquid crystal layer linearly polarizes the incident light to itself by absorbing the incident light components having specific wavelengths in specific directions that are determined by whether the electric field is applied or not. The electric field can be applied by transparent electrodes formed on the inner surface of the substrate.

The oblique evaporation film is formed by obliquely evaporating a material having a large index of refraction. The evaporated material, thickness of the film and the evaporation angle of the evaporated material regulate what wavelengths of light should be circularly polarized. Here, the evaporation angle means an angle formed between the direction of the evaporated material flying from the evaporation source and the transparent substrate.

For the evaporated material, either a conductive substance or a non-conductive substance may be used. For instance, the following may be used: silicon dioxide ($SiO_2$), cerium dioxide ($CeO_2$), tin dioxide ($SnO_2$), antimony oxide ($Sb_2O_3$), tungsten oxide ($WO_3$), tantalum oxide ($Ta_2O_5$), bismuth oxide ($Bi_2O_3$), niobium oxide ($Nb_2O_5$), lithium niobate ($LiNbO_3$), lithium tantalate ($LiTaO_3$), zirconium oxide ($ZrO_2$), titanium oxide ($TiO_2$), and double oxide of tin dioxide ($SnO_2$) and antimony oxide ($Sb_2O_3$), or a mixture of zinc oxide ($ZnO$) and aluminum oxide ($Al_2O_3$) (2 to 3 mole %), or a mixture of zinc oxide ($ZnO$) and indium oxide ($In_2O_3$) (2 to 3 mole %). The well-known method of forming vacuum film, such as vacuum evaporation, electron beam evaporation may be employed to evaporate the material obliquely.

The protective layer formed between the surfaces of the oblique evaporation film and the neighboring component member is for protecting the oblique evaporation film. For instance, it prevents the degradation of the oblique evaporation film due to the intrusion of water or proton ($H^+$) from the liquid crystal layer. The protective layer can be formed by the method of forming film, such as sputtering and ion plating, which offers a stronger bonding force because the protective layer is not required to perform the optical function strictly which the oblique evaporation film is required to perform.

Advantage of the Present Invention

As mentioned above, the present invention prevents, for instance, water, proton ($H^+$), and the like from intruding into the oblique evaporation film with the protective layer. Thus the present invention avoids the degradation and color change of the oblique evaporation film. As a result, the liquid crystal device according to the present invention has an improved durability, and avoids the aging of the display quality.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Having generally described this invention, a further understanding can be obtained by reference to certain specific examples which are provided herein for purposes of illustration only and are not intended to be limiting unless otherwise specified.

The present invention will be hereinafter explained with reference to preferred embodiments. The preferred embodiments are examples of glare shield reflection mirrors configured with the liquid crystal device according to the present invention.

EXAMPLE 1

Figure 1:
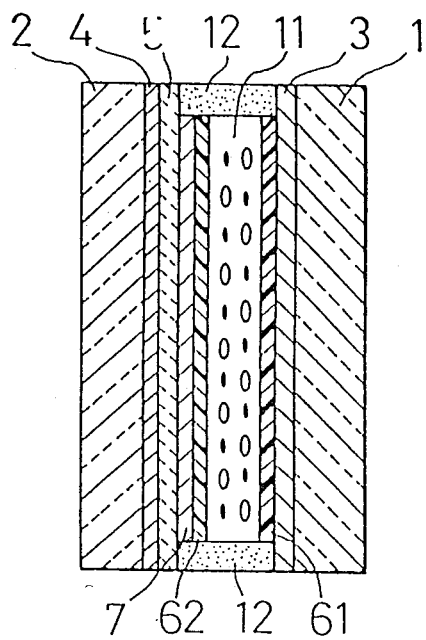
FIG. 1 is a schematic sectional illustration of a glare shield reflection mirror manufactured as Example 1.

FIG. 1 is a schematic sectional illustration of a glare shield reflection mirror manufactured as Example 1.

As illustrated in FIG. 1, the glare shield reflection mirror comprises the following:

float plate glasses 1 and 2 used as the transparent substrate, an indium tin oxide film 3 (hereinafter referred to as ITO film 3) formed on the inner surface of the float plate glass 1, and working as the transparent electrode, an aluminum reflection layer 4 formed on the inner surface of the float glass plate 2, and working as the electrode, a protective layer 5 formed on the surface of aluminum reflection layer 4, an oblique evaporation film 7 formed on the inner surface of the protective layer, aligning films 61 and 62 respectively formed on the surfaces of said ITO film 3 and oblique evaporation film 7, a plularity of spacers, not shown, forming a gap for sealing a liquid crystal layer between said aligning films 61 and 62, a guest-host liquid crystal layer 11 sealed between said gap, and an epoxy resin for bonding the periphery of said liquid crystal layer 11.

The manufacturing method of said liquid crystal device will be hereinafter explained.

(1) Preparation of the Protective Layer 5

The protective layer 5 is prepared as follows;

The aluminum reflection layer 4 is formed on a surface of the float glass plate 2, used as the transparent substrate, by vacuum evaporation. The aluminum oxide ($Al_2O_3$) film with approximately 5000 Å thickness is formed to prepare the protective layer 5 on the surface of the aluminum reflection layer 4 by sputtering.

(2) Preparation of the Oblique Evaporation Film 7

Figure 2:
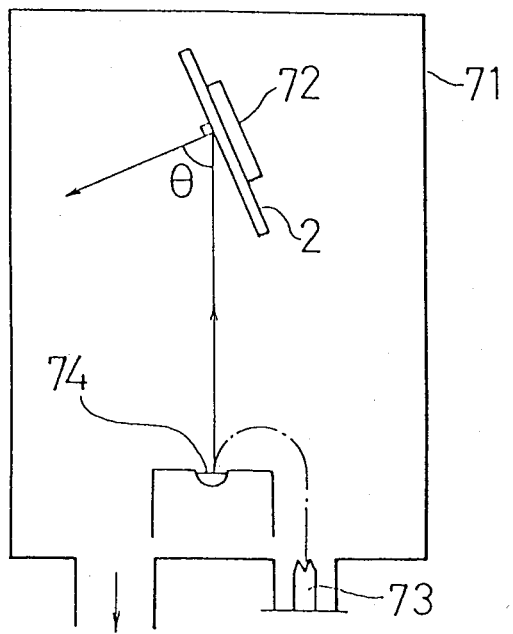
FIG. 2 illustrates how an oblique evaporation film 7 is formed on the surface of a protective layer 5 coated on a float glass plate 2 used as the transparent substrate.

The preparation of the oblique evaporation film 7 will be explained with reference to FIG. 2. FIG. 2 illustrates how the oblique evaporation film 7 working as the quarter wavelength retarding wave plate is formed on the surface of the protective layer 5 coating the float glass plate 2 used as the transparent substrate.

The oblique evaporation film 7 is prepared as follows:

First, the surface of the protective layer 5 coating the float glass plate 2 used as the transparent substrate is disposed over the evaporation source 74 in a vacuum chamber 71. The size of the float glass plate 2 is 60 mm length × 250 mm width × 1.1 mm thickness. Next, the float plate glass 2 is held by a substrate holder 72 obliquely by a predetermined angle in relation to the evaporation source 74 as illustrated in FIG. 2. Then tungsten oxide ($WO_3$) is evaporated on the float glass plate 2 by the incident angle of $\theta = 70°$ in relation to the normal of the float glass plate 2 by electron beam evaporation using an electron gun 73. The evaporation is performed until the thickness of the oblique evaporation film 7 has become 2.3 μm. Thus obtained oblique evaporation film 7 with 2.3 μm thickness evaporated by the incident angle of $\theta = 70°$ works as a quarter wavelength retarding wave plate with retardation of 1365.25 Å that is a quarter wavelength of light with 5461 Å wavelength.

(3) Preparation of the ITO Film 3

The ITO film 3 with a surface resistivity of 400 per square is prepared on an end surface of the float glass plate 1 by sputtering.

(4) Preparation of the Aligning Films 61 and 62

The aligning films 61 and 62 are prepared as follows:

Polyimide is coated on the surface which protective layer 5 for protecting said oblique evaporation film 7 is not formed. Next the float plate glass 2 coated with polyimide is calcined at 300° C. to form the aligning film 62. Then the aligning film 62 is subjected to rubbing treatment to have liquid crystal molecules aligned in parallel. The aligning film 61 is formed on the ITO film 3 of the float glass plate 1 by the same procedure. It is also subjected to the rubbing treatment.

(5) Sealing of Liquid Crystal

Polystyrene beads with an average grain diameter 8 to 11 μm working as the spacers are distributed on the aligning film 61 of said float plate glass 1. An epoxy adhesive is coated on the periphery of the aligning film 62 of the float glass plate 2 by screen printing, except an injection opening, later described. Then one of the float glass plate 1 and 2 is put on the other so that their aligning films face each other, and the adhesive is hardened to bond the float plate glasses 1 and 2. Finally a nematic liquid crystal with positive dielectric anisotropy, ZLI-1840 produced by Melk Co., Ltd. and black dichromatic dye, LHA-031B produced by Mitsubishi Kasei Co., Ltd. are injected into the space enclosed by the float glass plates 1, 2 and said adhesive through said injection opening by vacuum injection method, and the injection opening is sealed with the epoxy adhesive. The black dichromatic dye is dissolved into the nematic liquid crystal by 7 weight % in relation to the nematic liquid crystal.

Thus the liquid crystal glare shield reflection mirror shown in FIG. 1 is manufactured.

OPERATIONS OF EXAMPLE 1

When light passes through the float plate glass 1 and enters the liquid crystal layer 11, the light is linearly polarized due to absorption in the liquid crystal layer 11; i.e. the incident light perpendicular to the dichromatic dye (guest) molecule longitudinal axis is absorbed by the dichromatic dye (guest) having the alignment coinciding with that of the nematic liquid crystal (host)

under no voltage application during the light propagation from the ITO film 3 and the aluminum reflection layer 4 used as the electrode.

Next the linearly polarized light is circularly polarized either in the clockwise or counter clockwise direction by the oblique evaporation film 7. Then the circularly polarized light is reflected by the aluminum reflection layer 4, and the direction of circular polarization is reversed. The circularly polarized light again passes through the oblique evaporation film 7, and enters the liquid crystal layer 11 again in the state being perpendicular to the linearly polarized light at the beginning, and undergoes the light absorption. Thus the glare shield reflection mirror is put into the glare shielding state by regulating the reflectivity of the incident light. When an electric field is applied, said light absorption does not occur in the liquid crystal layer 11. As a result, the glare shield reflection mirror is put into the non glare shielding state because the light is not linearly polarized.

In the liquid crystal glare shield reflection mirror described above, the protective layer 5 prevents, for instance, the proton (H+) intrusion from the aluminum reflection layer 4 into the oblique evaporation film 7. Accordingly it is possible to prevent the color of the oblique evaporation film 7 from changing into blue because the color change is due to tungstic acid $H_xWO_3$ produced by the reaction of proton (H+) and tungsten oxide ($WO_3$).

EXAMPLE 2

Figure 3:
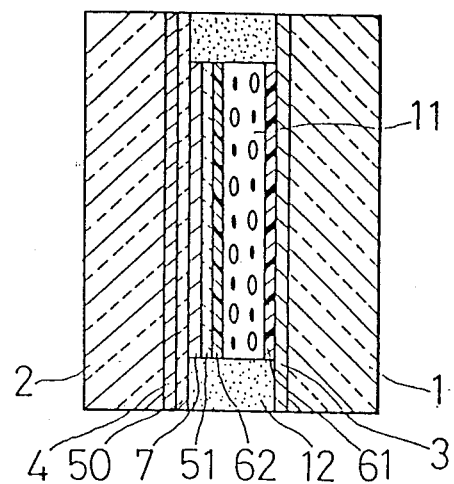
FIG. 3 is a schematic sectional ilustration of a glare shield reflection mirror manufactured as Example 2.

Example 2 is an example in which an extra protective layer is formed on the liquid crystal sealing surface of the oblique evaporation film 7 of Example 1. FIG. 3 schematically illustrates a section of a glare shield reflection mirror manufactured as Example 2. As FIG. 3 illustrates, a protective layer 50 and a protective layer 51 are respectively formed on both surfaces of the oblique evaporation film 7 to prevent not only the intrusion of the proton (H+) from the aluminum layer 4 but also the intrusion of water and the like from the liquid crystal layer 11 through the aligning film 62 into the oblique evaporation film 7. Thus it is possible to avoid the color changes of the oblique evaporation film 7 into blue due to the reaction of proton (H+) and tungsten oxide ($WO_3$) initiated by the water intrusion. In addition, it is possible to prevent tungsten oxide ($WO_3$) from aging due to the water.

EXAMPLE 3

Figure 4:
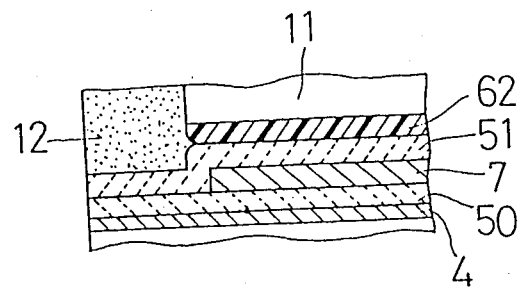
FIG. 4 is a schematic illustration, partially in section, of a glare shield reflection mirror manufactured as Example 3.

The epoxy resin 12 exhibits a protective function against the degradation of the oblique evaporation film 7 due to the intrusion of water into the oblique evaporation film 7 through the periphery thereof. The periphery of the oblique evaporation film 7 of Example 2 may be enclosed by the protective layer 51 as shown in FIG. 4 to make the protective function completely operative. This modified embodiment of Example 2 is illustrated in FIG. 4 as Example 3.

EXAMPLE 4

The following two preparations; i.e. preparations of protective layer 5 and oblique evaporation film 7 differ from those of Example 1 shown in FIG. 1. Other three preparations; i.e. preparations of ITO film 3 and aligning films 61 and 62, and sealing of a liquid crystal are identical with those of Example 1.

(1) Preparation of the Protective Layer 5

The protective layer 5 of Example 4 is prepared as follows:

The aluminum reflection layer 4 is formed on a surface of the float plate glass 2, using the tantalum oxide ($Ta_2O_5$) film with approximately 3000 Å thickness to prepare the protective layer 5 on the surface of the aluminum reflection layer 4 in oxygen ($O_2$) gas added argon (Ar) atomosphere by reactive sputtering instead of the following protective layer 5 preparation method for Example 1: an aluminum oxide ($Al_2O_3$) film with approximately 5000 Å thickness is formed to prepare the protective layer 5 on the surface of the aluminum reflection layer 4 by sputtering.

(2) Preparation of the Oblique Evaporation Film 7

The oblique evaporation film 7 of Example 4 is prepared as follows:

First, the surface of the protective layer 5 coating the float plate glass 2 used as the transparent substrate is disposed over the evaporation source 74 in a vacuum chamber 71. The size of the float glass plate 2 is 60 mm length×250 mm width×1.1 mm thickness. Next, the float glass plate 2 is held by a substrate holder 74 obliquely by a predetermined angle $\theta$ in relation to the evaporation source 74 as illustrated in FIG. 2. Then tantalum oxide ($Ta_2O_5$) is evaporated on the float plate glass 2 by the incident angle of $\theta=70°$ in relation to the normal of the float glass plate 2 by electron beam evaporation using an electron gun 73 in oxygen atmosphere. The evaporation is performed until the thickness of the oblique evaporation film 7 has become 1.6 μm. The oblique evaporation film 7 of Example 4 is thus prepared instead of the following oblique evaporation film 7 preparation method for Example 1: Tungsten oxide ($WO_2$) is evaporated on the float glass plate 2 by the incident angle of $\theta=70°$ in relation to the normal of the float glass plate 2 by electron beam evaporation using electron gun 73. The evaporation is performed until the thickness of the oblique evaporation film 7 has become 2.3 μm.

Thus obtained oblique evaporation film 7 of Example 4 with 1.6 micrometers thickness evaporated by the incident angle of $\theta=70°$ works as a quarter wavelength retarding wave plate with retardation of 1365.25 Å that is a quarter wavelength of light with 5461 Å wavelength.

OPERATIONS OF EXAMPLE 4

In Example 4, a close adhesion between the oblique evaporation film 7 having a larger inner stress and the aluminum reflection layer 4 is secured by the protective layer 5, and an accidental reaction between the oblique evaporation film 7 liable to deviate from the stoichiometric composition and the aluminum reflection layer 4 is prevented from taking place by the protective layer 5.

EXAMPLE 5

Figure 5:
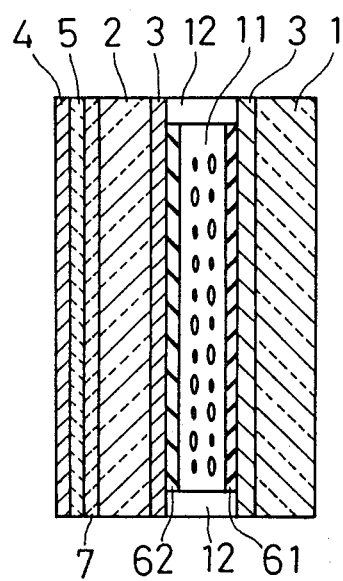
FIG. 5 is a schematic sectional illustration of a glare shield reflection mirror manufactured as Example 5.

FIG. 5 is a schematic sectional illustration of a glare shield reflection mirror manufactured as Example 5.

As illustrated in FIG. 5, the glare shield reflection mirror comprises the following:

float plate glasses 1 and 2 used as the transparent substrate,

ITO films 3 formed on the liquid crystal sealing surface of the float glass plate 1 and 2, which work as the transparent electrodes, aligning films 61 and 62 respectively formed on the surfaces of said ITO films 3 on the both substrate, a plurality of spacers, not shown, forming a gap for sealing a liquid crystal layer between said aligning films 61 and 62, a guest-host liquid crystal layer 11 sealed between said gap, an epoxy resin 12 for bonding the periphery of said liquid crystal layer 11, an oblique evaporation film 7 formed on the surface opposite to the liquid crystal sealing surface of the float glass plate 2, a protective layer 5 formed between said oblique evaporation film 7, and an aluminum reflection layer 4 later described, and an aluminum reflection layer 4 formed on the surface of the said protective layer 5.

The method of manufacturing said liquid crystal device will be hereinafter explained.

The following two preparations; i.e. oblique evaporation film 7 and preparations of protective layer 5 differ from those of Example 1. Other three preparations; i.e. preparations of ITO film 3 and aligning films 61 and 62, and sealing of liquid crystal are identical with those of Example 1.

(1) Preparation of the Oblique Evaporation Film 7

The method as described in the preparation of the oblique evaporation film 7 of Example 4 is used to evaporate tantalum oxide ($Ta_2O_5$) on the outer surface of the liquid crystal cell having the float glass plate 1 and 2, the ITO films 3, aligning films 61 and 62, and the epoxy resin 12 before the liquid crystal sealing.

(2) Preparation of the Protective layer 5

After the preparation of the oblique evaporation film 7, the protective layer 5 is formed on the surface of the tantalum oxide ($Ta_2O_5$) oblique evaporation film 7 by sputtering silicon dioxide ($SiO_2$) so as to form the silicon dioxide ($SiO_2$) film of 800 Å thickness.

OPERATION OF EXAMPLE 5

It is not necessary to change the processes for manufacturing the liquid crystal cell of Example 5, because a conventional liquid crystal cell having the float glass plate 1 and 2, the ITO films 3, aligning films 61 and 62, and the epoxy resin 12 may be used to manufacture Example 5.

The drop in the reflectivity of the aluminun reflection layer 4 can be prevented because Example 5 has the protective layer 5. If the protective layer 5 is not provided between the oblique evaporation film 7 and the aluminum reflection layer 4, the humidity in the atmosphere will cause the reaction between the aluminum reflection layer 4 and the oblique evaporation film 7 as time passes. Accordingly, the reflectivity of the aluminum reflection layer 4 will drop sharply.

Further when the silicon dioxide ($SiO_2$) protective layer 5 has a thickness in the range of 750 Å to 850 Å, it produces a gain in the reflectivity by 3 to 5%.

Having now fully described the invention, it will be apparent to one of ordinary skill in the art that many changes and modifications can be made thereto without departing from the spirit of scope of the invention as set forth herein.

What is claimed is:

1. A liquid crystal device comprising:
   first and second substrate plates, wherein at least said first substrate plate is transparent;
   a liquid crystal layer filled in a closed space between said substrate plates;
   voltage applying means for applying a voltage to said liquid crystal layer; and
   a reflection layer and an oblique evaporation film laminated on said second substrate plate, wherein said oblique evaporation film is comprised of oxides of colorless transparent materials and placed nearer to said liquid crystal layer than to said reflection layer, for retarding transmitting lights having a predetermined wavelength by a predetermined phase,
   wherein a protective layer composed of inorganic transparent materials is formed on at least one main surface of said oblique evaporation film to reduce contamination of said oblique evaporation film.

2. A liquid crystal device according to claim 1, wherein said protective layer is laminated between said reflection layer and said oblique evaporation film.

3. A liquid crystal device according to claim 1, wherein said protective layer is laminated between said liquid crystal layer and said oblique evaporation film.

4. A liquid crystal device according to claim 1, wherein said protective layer is laminated on both of the main surfaces of said oblique evaporation film.

5. A liquid crystal device according to claim 1, wherein said device is a glare shield reflection mirror.

6. A liquid crystal device according to claim 1, wherein said oblique evaporation film is comprised of tungsten oxide.

7. A liquid crystal device according to claim 1, wherein said oblique evaporation film is comprised of tantalum oxide.

8. A liquid crystal device according to claim 1, wherein said reflection component member is made of metal, and said oblique evaporation film retards transmitting lights having a predetermined wavelength by a phase corresponding to one quarter of the wavelength.

9. A liquid crystal device according to claim 8, wherein said reflection component member is made of aluminum.

10. A liquid crystal device according to claim 1, wherein said protective layer is formed of a material selected from the group consisting of metal oxide such as titanium oxide ($TiO_2$), zirconium oxide ($ZrO_2$), aluminum oxide ($Al_2O_3$), and silicon dioxide ($SiO_2$), metal nitride such as silicon nitride ($Si_3N_4$) and titanium nitride (TiN), metal carbide such as silicon carbide (SiC) and tungsten carbide (WC), oxynitride such as silicon oxynitride ($SiO_xN_y$), and plasma polymerization film made of organic compound such as methane, acetylene, furan, and tetrafluoroethylene.

11. A liquid crystal device according to claim 1, wherein the thickness of said protective film is 100 Å to 1 μm.

12. A liquid crystal device according to claim 1, wherein said protective layer is formed by sputtering, ion plating, or plasma polymerization.

* * * * *

UNITED STATES PATENT AND TRADEMARK OFFICE
CERTIFICATE OF CORRECTION

PATENT NO. : 4,813,768
DATED : March 21, 1989
INVENTOR(S) : Shigeki HAMAGUCHI et al.

It is certified that error appears in the above-identified patent and that said Letters Patent is hereby corrected as shown below:

The name of inventor "Tomoyashi Motohiro" should be --Tomoyoshi Motohiro--.

In the Abstract, line 12, "a bluish" should read --as bluish--.

Column 1, line 17, "s a quarter" should read --as a quarter--.

Column 1, line 35, "H-" should read --$H^{+}$--.

Signed and Sealed this

Sixth Day of March, 1990

Attest:

Attesting Officer

JEFFREY M. SAMUELS

Acting Commissioner of Patents and Trademarks